United States Patent
Liu et al.

(10) Patent No.: US 12,516,255 B2
(45) Date of Patent: Jan. 6, 2026

(54) METHOD FOR PRODUCING LIGHT AROMATIC HYDROCARBONS

(71) Applicants: CHINA PETROLEUM & CHEMICAL CORPORATION, Beijing (CN); SINOPEC RESEARCH INSTITUTE OF PETROLEUM PROCESSING CO., LTD., Beijing (CN)

(72) Inventors: Tong Liu, Beijing (CN); Jieguang Wang, Beijing (CN); Jiaxin Wang, Beijing (CN); Aizeng Ma, Beijing (CN); Jianqiang Ren, Beijing (CN); Chunming Wang, Beijing (CN); Xinkuan Zhang, Beijing (CN); Chen Dong, Beijing (CN)

(73) Assignees: CHINA PETROLEUM & CHEMICAL CORPORATION, Beijing (CN); SINOPEC RESEARCH INSTITUTE OF PETROLEUM PROCESSING CO., LTD., Beijing (CN)

( * ) Notice: Subject to any disclaimer, the term of this patent is extended or adjusted under 35 U.S.C. 154(b) by 168 days.

(21) Appl. No.: 18/555,898

(22) PCT Filed: Apr. 22, 2022

(86) PCT No.: PCT/CN2022/088336
§ 371 (c)(1),
(2) Date: Oct. 18, 2023

(87) PCT Pub. No.: WO2022/223012
PCT Pub. Date: Oct. 27, 2022

(65) Prior Publication Data
US 2024/0376390 A1 Nov. 14, 2024

(30) Foreign Application Priority Data

Apr. 23, 2021 (CN) .......................... 202110440767.6

(51) Int. Cl.
*C10G 59/02* (2006.01)
*B01J 23/62* (2006.01)
*B01J 29/44* (2006.01)

(52) U.S. Cl.
CPC ............ *C10G 59/02* (2013.01); *B01J 23/622* (2013.01); *B01J 29/44* (2013.01); *C10G 2300/70* (2013.01); *C10G 2400/30* (2013.01)

(58) Field of Classification Search
CPC ................ C10G 59/02; C10G 2300/70; C10G 2400/30; C10G 47/18; C10G 35/095;
(Continued)

(56) References Cited

U.S. PATENT DOCUMENTS 3,216,789 A * 11/1965 Acara .................... F16D 3/382
423/718
6,063,724 A 5/2000 Resasco et al.
2022/0048015 A1* 2/2022 Snell .................... B01J 37/082

FOREIGN PATENT DOCUMENTS

CN 86107521 A 5/1988
CN 1566046 A 1/2005
(Continued)

OTHER PUBLICATIONS

Bernard, J.R.; "Hydrocarbons Aromatization on Platinum Alkaline Zeolites"; In Proceedings of the 5th International Conference on Zeolites, Wiley, New York, Year: 1980; pp. 686-693.

*Primary Examiner* — Randy Boyer
*Assistant Examiner* — Juan C Valencia
(74) *Attorney, Agent, or Firm* — NKL Law; Allen Xue (57) ABSTRACT

A method for producing light aromatic hydrocarbons from $C_9^+$ aromatic hydrocarbons includes a step of contacting a
(Continued)

$C_9^+$ aromatic hydrocarbon with a dealkylation catalyst comprising a KL zeolite, and platinum and a modifying metal supported thereon in the presence of hydrogen, to obtain a light aromatic hydrocarbon. The modifying metal is selected from the group consisting of Group IIA metals and rare earth metals. By using a Pt/KL catalyst comprising a specific modifying metal in the dealkylation reaction of $C_9^+$ aromatic hydrocarbons for producing light aromatic hydrocarbons, the method shows the advantages of high conversion rate of feedstock, high yield of light aromatic hydrocarbons, good reaction selectivity.

23 Claims, 1 Drawing Sheet

(58) Field of Classification Search
CPC ...... C10G 47/20; C10G 65/10; C10G 51/026; C10G 2300/1044; C10G 51/02; B01J 23/622; B01J 29/44; B01J 29/62; B01J 23/58; B01J 23/63; C07C 2521/04; C07C 2523/14; C07C 2523/42; C07C 2523/62; C07C 2529/62; C07C 4/18; C07C 15/02; C07C 15/04; C07C 15/06; C07C 15/08; Y02P 20/52

See application file for complete search history.

(56) References Cited

FOREIGN PATENT DOCUMENTS

| | | |
|---|---|---|
| CN | 1231559 C | 12/2005 |
| CN | 101121132 A | 2/2008 |
| CN | 101121138 A | 2/2008 |
| CN | 101121144 A | 2/2008 |
| CN | 101172924 A | 5/2008 |
| CN | 101376823 A | 3/2009 |
| CN | 102795958 A | 11/2012 |
| CN | 106391098 A | 2/2017 |
| CN | 107868674 A | 4/2018 |
| CN | 108236964 A | 7/2018 |
| CN | 109401785 A | 3/2019 |
| CN | 110358577 A | 10/2019 |
| EP | 0770666 A1 | 5/1997 |

* cited by examiner

METHOD FOR PRODUCING LIGHT AROMATIC HYDROCARBONS

CROSS REFERENCE TO RELATED APPLICATIONS

This application is a U.S. national stage entry of PCT international Application No. PCT/CN2022/088336, filed on Apr. 22, 2022, which claims priority from Chinese patent application No. 202110440767.6, titled "method for producing light aromatic hydrocarbons from naphtha", filed on Apr. 23, 2021, the contents of which is incorporated herein by reference in their entirety.

TECHNICAL FIELD

The present application relates to the field of catalytic conversion of aromatic hydrocarbons, particularly to a method for producing light aromatic hydrocarbons from $C_9^+$ aromatic hydrocarbons.

BACKGROUND ART

Naphtha typically comprises C6-C12 paraffinic, naphthenic and aromatic components, and the main scheme for its processing is to convert paraffinic and naphthenic molecules into aromatic hydrocarbons or high-octane gasoline blending components by catalytic reforming and other technologies, and simultaneously produce high-value-added hydrogen. The liquid product of reforming reaction comprises unconverted light paraffins having 7 or less carbon atoms and heavy aromatics having 9 or more carbon atoms, in addition to light aromatic hydrocarbons, such as BTX.

The main reactions occurring in the catalytic reforming reaction process include six major reactions, such as dehydrogenation reaction of six-membered naphthenic hydrocarbons, dehydroisomerization reaction of five-membered naphthenic hydrocarbons, isomerization reaction of paraffinic, naphthenic and aromatic hydrocarbons, dehydrocyclization reaction of paraffins, hydrogenolysis and hydrocracking reaction of alkanes. Conventional catalytic reforming reactions follow the principle of "converting naphtha components with a certain carbon number into products with the same number of carbon atoms", and the product distribution follows the chemical thermodynamics and kinetics rules. Thus, after the reforming catalyst and the process technology are determined, the yield of aromatic hydrocarbons and the distribution of the products depend on the composition of the feedstock, and the proportions of benzene, toluene and xylene isomers and the proportion of heavy aromatic hydrocarbons in the products are basically unchanged. In the existing catalyst systems, the space for regulating and controlling the distribution of each product by changing the reaction conditions is very limited.

Since the main reforming reactions follow the principle that the carbon number of the reactants is the same as that of the products (except for hydrogenolysis and hydrocracking reaction of alkanes), the content of heavy aromatics having 9 or more carbon atoms in the reformate is high, and can typically reach 20% by mass. Heavy aromatics cannot be used entirely as gasoline blending components due to the limitations of the end point of the finished gasoline. Although part of the heavy aromatics can be separated by rectification and sold as a product, the market capacity is limited. Dehydrocyclization reaction of C6 and C7 light alkanes are relatively slow and the conversion thereof is typically increased by increasing the severity of the reforming operation. However, the increase in the severity causes problems such as deterioration in the selectivity of the reaction, as well as the decrease in the yield of liquid product and the consumption of hydrogen due to the promotion of hydrocracking reaction and the like.

Chinese patent application No. CN102795958A discloses a method for producing aromatic hydrocarbons and ethylene using naphtha as a feedstock, comprising the steps of contacting the naphtha with a reforming catalyst to carry out a selective catalytic reforming reaction in the presence of hydrogen under conditions including a pressure of 0.15-3.0 MPa, a temperature of 300-540° C., and a volume space velocity of 2.1-50 $h^{-1}$, so that the conversion rate of naphthenic hydrocarbons in the naphtha is more than 85% by mass, and the conversion rate of paraffinic hydrocarbons converted into aromatic hydrocarbons and $C_4^-$ hydrocarbons is less than 30% by mass; sending the reformate obtained by catalytic reforming to an aromatic hydrocarbons separation device to separate paraffinic hydrocarbons from aromatic hydrocarbons to obtain a fraction rich in aromatic hydrocarbons and a fraction rich in paraffinic hydrocarbons; sending the fraction rich in paraffinic hydrocarbons to a steam cracking device for cracking reaction to produce ethylene.

Chinese patent application No. CN101376823A discloses a naphtha catalytic reforming method, comprising the steps of introducing naphtha into a reactor of a conventional catalytic reforming device, subjecting the reformate to gas-liquid separation to obtain a gas component, a $C_8^-$ light component and a $C_9^+$ heavy component, and carrying out a lightening reaction on the $C_9^+$ heavy component in the presence of an aromatic lightening catalyst. The lightening reaction is preferably carried out under conditions including a reaction temperature of 420-530° C., a pressure of 0.8-1.5 MPa, a liquid feeding volume space velocity of 1-10 $h^{-1}$, and a hydrogen-to-hydrocarbon molar ratio of 0.1-10.0. The lightening catalyst comprises a active component of iridium, potassium and chlorine, and an alumina carrier. In the examples of this patent application, the conversion rate of $C_9^+$ heavy aromatics is between 56.90% and 69.37% by mass and the yield of BTX is between 43.00% and 54.61% by mass.

Chinese patent application No. CN109401785A discloses a naphtha upgrading method, comprising the steps of contacting naphtha with a dehydrogenation catalyst to conduct a dehydrogenation reaction under dehydrogenation conditions in a first reaction zone, to convert a part of naphthenic hydrocarbons in the naphtha into aromatic hydrocarbon; wherein the dehydrogenation conditions preferably include a reaction temperature of 380-440° C., a reaction pressure of 0.3-0.6 MPa, a feeding mass space velocity of 4-10 $h^{-1}$, and a gas/oil volume ratio of 200-600; and the dehydrogenation catalyst comprises a first carrier and chlorine and a Group VIII metal supported on the first carrier; and introducing the reaction product obtained in the first reaction zone into a second reaction zone to contact with a modifying catalyst for modifying reaction, and cooling and separating the resulting reaction product to obtain a gas product and a liquid product. In the examples of this patent application, the liquid product yield is between 79.15% and 85.95% by mass, and the aromatic content in the liquid product is between 28.02% and 36.17% by mass.

Chinese patent application No. CN110358577A discloses a method for converting naphtha into high-octane gasoline and aromatic hydrocarbons, comprising the steps of: contacting naphtha with a reforming catalyst in the presence of hydrogen under conditions of 0.2-2.0 MPa, 350-520° C., a volume space velocity of 1.0-5.0 h$^{-1}$ and a hydrogen-to-hydrocarbon molar ratio of 0.5-20:1 to perform moderate reforming reaction, so that the conversion rate of naphthenic hydrocarbons in the naphtha is more than 85% by mass, the conversion rate of $C_8^+$ paraffinic hydrocarbons is more than 50% by mass and the conversion rate of $C_6$ paraffinic hydrocarbons is not more than 5% by mass; performing aromatics separation on the reformate obtained by the catalytic reforming reaction to obtain an aromatic hydrocarbon-rich component and a paraffin-rich component, and splitting the paraffin-rich component into a $C_5$-$C_6$ fraction and a $C_7^+$ fraction by rectification; contacting the $C_5$-$C_6$ fraction with an isomerization catalyst for isomerization reaction, mixing the resulting isomerization product with a $C_7^+$ fraction and then contacting with an aromatization catalyst for aromatization reaction, wherein the aromatization catalyst comprises a KL zeolite and platinum supported on the KL zeolite, wherein the platinum is present in an amount of 0.1-1.5% by mass based on the amount of the KL zeolite.

Chinese patent No. CN1231559C discloses a catalytic reforming process for the production of an aromatic-rich product using three catalyst zones, comprising the steps of catalytically reforming a hydrocarbon feedstock in a process train comprising a first dual-function catalyst reforming zone, a zeolite reforming zone containing therein a catalyst comprising a platinum group metal and a non-acidic zeolite, and a final dual-function catalyst reforming zone. The conditions in the first reforming zone include a reaction pressure of 100 kPa to 1 MPa, a liquid hourly space velocity of 0.2-20 h$^{-1}$, a molar ratio of hydrogen to $C_5^+$ of 0.1-10, and a temperature of 400-560° C.; the conditions in the second reforming zone include a reaction pressure of 100 kPa to 6 MPa, a liquid hourly space velocity of 1-40 h$^{-1}$, and a temperature of 260-560° C.; the conditions in the final reforming zone include a reaction pressure of 100 kPa to 1 MPa, a liquid hourly space velocity of 0.2-10 h$^{-1}$, a molar ratio of hydrogen to $C_5^+$ of 0.1-10, and a temperature of 400-560° C. In the examples of this patent, the combination of the two catalysts described above in four reforming reactors was simulated using a kinetic model, providing a BTX yield between 45.02% and 49.28%.

Up to now, heavy aromatics lightening catalysts reported mainly comprise one or more molecular sieves such as ZSM-5, HZSM-5, HY, USY, NaY, R zeolite, MCM-41, ZSM-12, MOR, NU-87, MFI and the like, wherein the molecular sieve can be directly used or modified, and alumina or other oxides are used as carriers. Part of the catalysts are added with platinum, palladium, iridium or compounds thereof. The reaction feedstock is $C_9^+$ or $C_{10}^+$ heavy aromatics, or narrower fractions, such as $C_9$ heavy aromatics or $C_{10}$ heavy aromatics.

L-type molecular sieves (code of the International Molecular Sieve Association: LTL) are a type of basic macroporous molecular sieves developed by Union Carbide in 1965, and no equivalent has been found in nature so far. Platinum loaded L molecular sieves have gained widespread interest as n-paraffin dehydrocyclization catalysts, since Bernard (Proc. 5th Int. Conf. on Zeolites, Wiley, New York, 1980, 68) found that PtKL had much higher activity and selectivity for aromatization of n-hexane than conventional bifunctional catalysts. Then, Pt/KL molecular sieve catalysts were used for dehydrogenation and reforming reactions in commercial applications, but the use of such catalysts for lightening reactions of heavy aromatics has not been reported.

Chinese patent application No. CN108236964A discloses a bimetallic catalytic reforming catalyst comprising an LTL molecular sieve, which comprises: a catalyst carrier composed of an LTL molecular sieve and an adhesive, and an active component comprising a Group VIIIB metal, Sn or Re element. The cations in the LTL molecular sieve are partially or fully exchanged and replaced by lanthanide metal ions. In the examples of this patent application, a reformate from Liao Yang petrochemistry was used as the feedstock and reacted for 10 hours under conditions including a reaction temperature of 500° C., a pressure of 0.5 MPa, a volume space velocity of 3 h$^{-1}$ and a hydrogen-to-oil volume ratio of 800, the yield of the resulting aromatic hydrocarbons is between 60% and 72%, and the yield of $C_5^+$ liquid is between 80% and 92%.

Chinese patent application No. CN106391098A discloses a naphtha reforming catalyst and preparation thereof, which catalyst comprises a carrier, a metal and carbon. A certain amount of monosaccharide is added during the preparation of a Pt/KL reforming catalyst, so that the dispersion of metal Pt is improved, the carbon deposition rate of the catalyst in the reaction process is reduced, and in turn the reforming reaction performance of the Pt/KL catalyst can be improved. In the examples of this patent application, a Fischer-Tropsch straight-run naphtha was used as a feedstock for catalytic reforming, and the reaction was carried out under conditions including a reaction temperature of 500° C., a pressure of 0.7-1.0 MPa, a volume space velocity of 1.0 h$^{-1}$, and a hydrogen-to-oil molar ratio of 6, so that the yield of the resulting aromatic hydrocarbons is between 49.97% and 74.33%, and the yield of $C_5^+$ liquid is between 71.81% and 83.04%.

DISCLOSURE OF THE INVENTION

An objection of the present application is to provide a method for producing light aromatic hydrocarbons, which can be used to produce light aromatic hydrocarbons with high efficiency using $C_9^+$ aromatics or $C_9^+$ paraffins as starting materials.

In an aspect, the present application provides a method for producing light aromatic hydrocarbons from $C_9^+$ aromatic hydrocarbons, comprising a step of contacting a $C_9^+$ aromatic hydrocarbon with a dealkylation catalyst comprising a KL zeolite and platinum and a modifying metal supported thereon in the presence of hydrogen to obtain a light aromatic hydrocarbon, wherein the modifying metal is selected from the group consisting of Group IIA metals and rare earth metals.

The method of the present application uses a Pt/KL catalyst comprising a specific modifying metal in the dealkylation reaction of $C_9^+$ aromatic hydrocarbons to produce light aromatic hydrocarbons, and has the advantages of high conversion rate of feedstock, high yield of light aromatic hydrocarbons, good reaction selectivity and the like.

In another aspect, the present application provides a method for producing light aromatic hydrocarbons from a feedstock comprising $C_9^+$ paraffins, comprising the steps of:
1) contacting a feedstock comprising a $C_9^+$ paraffinic hydrocarbon with a dehydrogenation catalyst in the presence of hydrogen in a first reaction zone for reaction, to dehydrocyclize at least a part of said $C_9^+$ paraffinic hydrocarbon to obtain a $C_9^+$ aromatic hydrocarbon, optionally separating the resulting product, to obtain a stream comprising the $C_9^+$ aromatic hydrocarbon, wherein said dehydrogenation catalyst comprises alumina and a Group VIII metal, a Group IVA metal, a Group IA metal and a halogen supported thereon;

2) contacting the $C_9^+$ aromatic hydrocarbon-containing stream obtained in step 1) with a dealkylation catalyst in the presence of hydrogen in a second reaction zone to dealkylate at least a part of said $C_9^+$ aromatic hydrocarbon to obtain a light aromatic hydrocarbon, wherein said dealkylation catalyst comprises a KL zeolite and platinum and a modifying metal supported thereon, wherein said modifying metal is selected from the group consisting of Group IIA metals and rare earth metals.

The method of the present application can convert $C_9^+$ paraffins into light aromatic hydrocarbons, such as BTX, with high efficiency by carrying out directional dehydrocyclization reaction on $C_9^+$ paraffins in the feedstock comprising $C_9^+$ paraffins in a first reaction zone to obtain $C_9^+$ aromatic hydrocarbons and then carrying out dealkylation reaction on $C_9^+$ aromatic hydrocarbons in a second reaction zone, thereby improving the utilization value of $C_9^+$ paraffins.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
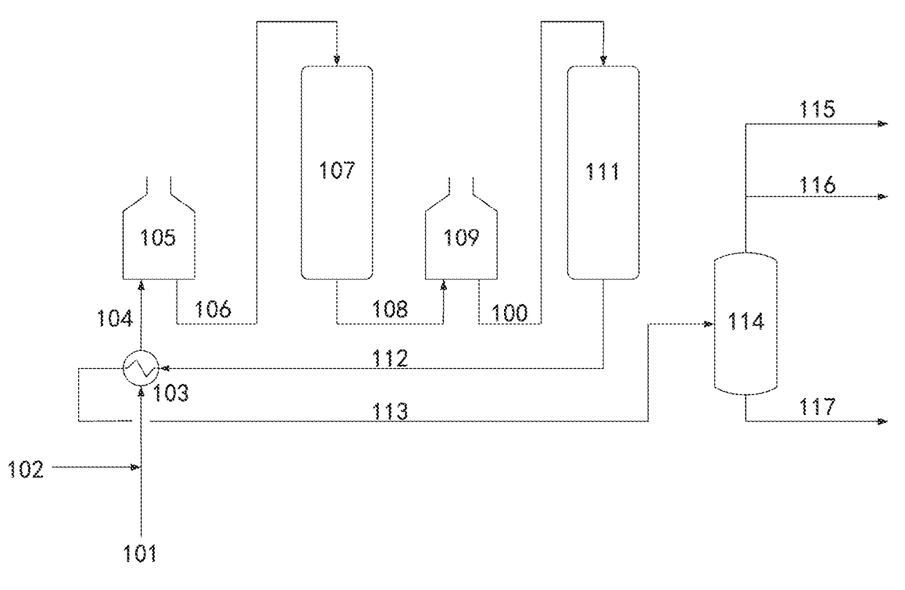
The FIGURE is a schematic flow diagram of a preferred embodiment of the method of the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, the term "$C_9^+$ paraffin(s) or $C_9^+$ paraffinic hydrocarbon(s)" refers to linear or branched alkane(s) having 9 or more carbon atoms, including but not limited to n-nonane, 2-methyloctane, 2,3,5-trimethylhexane, and the like; the term "$C_9^+$ aromatic(s) or $C_9^+$ aromatic hydrocarbon(s)" refers to aromatic hydrocarbon(s) having 9 or more carbon atoms, including but not limited to n-propylbenzene, m-methylethylbenzene, 1,3,5-trimethylbenzene, and the like; the term "$C_7^-$ paraffin(s) or $C_7^-$ paraffinic hydrocarbon(s)" refers to paraffinic hydrocarbon(s) having 7 or less carbon atoms, including but not limited to n-hexane, 2-methylpentane, 2,3-dimethylpentane, and the like.

In the context of the present application, the term "light aromatics or light aromatic hydrocarbon(s)" refers to aromatic hydrocarbon(s) having 6 to 8 carbon atoms, including benzene, toluene, various isomers of xylene, and ethylbenzene, such as BTX.

In the context of the present application, the term "naphtha" generally refers to various light oils having a boiling range from 30° C. to 220° C. derived from the processing of crude oil or other hydrocarbonaceous starting materials. For example, the naphtha can be straight-run naphtha, hydrocracking heavy naphtha, hydrotreated coking gasoline, raffinate of ethylene pyrolysis gasoline, catalytic cracking gasoline, or a mixture of two or more of them. Preferably, the naphtha comprises naphthenic hydrocarbons having 6-12 carbon atoms, paraffinic hydrocarbons having 6-12 carbon atoms and aromatic hydrocarbons having 6-12 carbon atoms, and has an initial boiling point of 80-95° C. and a final boiling point of 135-180° C.

In the present application, unless otherwise indicated, the pressures given are absolute pressures.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

It is normally believed that L molecular sieves have a relatively small pore size, and $C_8^+$ aromatic hydrocarbons cannot be generated or converted inside the pore channels thereof, and thus L molecular sieves are mainly used as catalysts for selective dehydrocyclization of $C_6$-$C_7$ paraffins. However, the inventors of the present application have surprisingly found that $C_9^+$ aromatic hydrocarbons can be converted into light aromatic hydrocarbons, such as BTX, by efficiently removing pendant alkyl groups thereof in the presence of hydrogen and a KL zeolite-based catalyst comprising platinum and a specific modifying metal, thereby accomplishing the present invention.

As described above, in a first aspect, the present application provides a method for producing light aromatic hydrocarbons from $C_9^+$ aromatic hydrocarbons, comprising a step of contacting a $C_9^+$ aromatic hydrocarbon with a dealkylation catalyst comprising a KL zeolite and platinum and a modifying metal supported thereon in the presence of hydrogen, to obtain a light aromatic hydrocarbon, wherein the modifying metal is selected from the group consisting of Group IIA metals and rare earth metals.

In a preferred embodiment, the dealkylation catalyst comprises a KL zeolite and, supported thereon, 0.1-1.5% by mass, preferably 0.3-1.2% by mass of platinum, and 0.02-4.0% by mass, preferably 0.1-3.0% by mass, of a modifying metal, relative to the amount of KL zeolite, wherein the contents of platinum and modifying metal are calculated on the basis of metal. Further preferably, the Group IIA metal is selected from the group consisting of barium and calcium, and the rare earth metal is one or more selected from the group consisting of La, Ce, Gd, Y, Sm and Yb. Particularly preferably, the average diameter of the grains of the KL zeolite is 0.1-2 µm.

The dealkylation catalyst can be prepared by methods conventionally used in the art. In a preferred embodiment, the dealkylation catalyst may be prepared by a method comprising the steps of: impregnating the KL zeolite with an aqueous solution of a platinum-containing compound and a compound containing a Group IIA metal and/or a rare earth metal, and then drying and calcining. The platinum-containing compound is preferably a compound containing a Pt cation, such as $Pt(NH_3)_2Cl_2$; the compound containing a Group IIA metal and/or a rare earth metal is preferably a soluble hydroxide, chloride or nitrate of the corresponding metal, such as $BaCl_2$. The drying temperature is preferably 90-150° C. and the drying time is preferably 8-24 hours; the calcining temperature is preferably 300-400° C., and the calcining time is preferably 2-8 hours.

In a preferred embodiment, the dealkylation conditions include: a temperature of 350-490° C., preferably 450-480° C., a pressure of 0.1-4.0 MPa, preferably 0.1-2.0 MPa, more preferably 0.1-0.5 MPa, a mass space velocity of $C_9^+$ aromatic hydrocarbon of 1-20 $h^{-1}$, preferably 1-10 $h^{-1}$, a molar ratio of hydrogen to $C_9^+$ aromatic hydrocarbons of 0.5-20:1, preferably 1-10:1.

In a further preferred embodiment, the dealkylation reaction may be carried out in one reactor or a plurality (e.g. 2 to 3) of reactors connected in series, preferably in one reactor or two reactors connected in series, with the mass space velocity of the $C_9^+$ aromatic hydrocarbon being 1-20 $h^{-1}$, preferably 1-10 $h^{-1}$, more preferably 1-5 $h^{-1}$, and the molar ratio of hydrogen to $C_9^+$ aromatic hydrocarbon being 0.5-20:1, preferably 1-10:1, wherein in the case that a plurality of reactors are used, the mass space velocity is calculated relative to the total amount of catalyst used in all reactors and the molar ratio of hydrogen to $C_9^+$ aromatic hydrocarbon refers to that at the inlet of the first reactor.

The method according to the first aspect of the present application is useful for producing light aromatic hydrocarbons from a variety of feedstocks comprising $C_9^+$ aromatic hydrocarbons, for example the feedstock may have a $C_9^+$ aromatics content of 20% by mass or more, 50% by mass or more, 80% by mass or more, or 90% by mass or more.

In a second aspect, the present application provides a method for producing light aromatic hydrocarbons from feedstocks comprising $C_9^+$ paraffinic hydrocarbons, comprising the steps of:
1) contacting a feedstock comprising a $C_9^+$ paraffinic hydrocarbon with a dehydrogenation catalyst in the presence of hydrogen in a first reaction zone for reaction to dehydrocyclize at least a part of said $C_9^+$ paraffinic hydrocarbon to obtain a $C_9^+$ aromatic hydrocarbon, optionally separating the resulting product, to obtain a stream comprising the $C_9^+$ aromatic hydrocarbon, wherein said dehydrogenation catalyst comprises alumina and a Group VIII metal, a Group IVA metal, a Group IA metal and a halogen supported thereon;
2) contacting the $C_9^+$ aromatic hydrocarbon-containing stream obtained in step 1) with a dealkylation catalyst in the presence of hydrogen in a second reaction zone to dealkylate at least a part of said $C_9^+$ aromatic hydrocarbon to obtain a light aromatic hydrocarbon, wherein said dealkylation catalyst comprises a KL zeolite and platinum and a modifying metal supported thereon, wherein said modifying metal is selected from the group consisting of Group IIA metals and rare earth metals.

In a preferred embodiment, the reaction conditions of step 1) include: a temperature of 400-500° C., preferably 450-480° C., a pressure of 0.1-4.0 MPa, preferably 0.1-2.0 MPa, more preferably 0.1-0.5 MPa, a mass space velocity of the feedstock comprising $C_9^+$ paraffinic hydrocarbon of 1-50 $h^{-1}$, preferably 1-20 $h^{-1}$, more preferably 1-10 $h^{-1}$, a hydrogen-to-hydrocarbon molar ratio of 0.5-20:1, preferably 1-10:1.

In some preferred embodiments, the first reaction zone comprises one reactor or a plurality (e.g., 2 to 5) of reactors connected in series, preferably one reactor or 2 to 4 reactors connected in series, and, in the first reaction zone, the mass space velocity of the feedstock comprising $C_9^+$ paraffinic hydrocarbon may be 1-50 $h^{-1}$, preferably 1-20 $h^{-1}$, more preferably 1-10 $h^{-1}$, and the hydrogen-to-hydrocarbon molar ratio may be 0.5-20:1, preferably 1-10:1, wherein in the case that a plurality of reactors are used, the mass space velocity is calculated relative to the total amount of catalyst used in all reactors of the first reaction zone and the hydrogen-to-hydrocarbon molar ratio refers to that at the inlet of the first reactor.

According to the present application, step 1) allows $C_9^+$ paraffinic hydrocarbon(s) in the feedstock to undergo dehydrocyclization reaction to yield $C_9^+$ aromatic hydrocarbon(s). Meanwhile, if $C_6$-$C_8$ naphthenic hydrocarbon(s) is also present in the feedstock, the step 1) may also allow the naphthenic hydrocarbon to undergo dehydrogenation reaction and be directionally converted into light aromatic hydrocarbon(s) with the same number of carbon atoms. Preferably, in the dehydrogenation catalyst used in step 1), the Group VIII metal is selected from the group consisting of platinum, palladium and iridium, the Group IVA metal is selected from the group consisting of tin, germanium and silicon, the Group IA metal is selected from the group consisting of potassium, sodium, rubidium and cesium, and the halogen is selected from the group consisting of chlorine, fluorine, bromine and iodine. To control the reaction in step 1), it is preferable to use a less acidic catalyst to suppress dehydrocyclization and hydrocracking reactions of $C_7^-$ light paraffinic hydrocarbon(s) that may be contained in the feedstock. In a preferred embodiment, the dehydrogenation catalyst comprises an alumina carrier and, relative to the amount of the carrier, 0.1-2.0% by mass of a Group VIII metal, preferably platinum, 0.1-2.0% by mass of a Group IVA metal, preferably tin, 0.01-0.2% by mass of a Group IA metal, preferably potassium, and 0.3-5% by mass of a halogen, preferably chlorine, wherein the metal and halogen contents are both calculated on an elemental basis.

In a further preferred embodiment, the dehydrogenation catalyst has a platinum content of 0.1-1.0% by mass, a tin content of 0.1-1.0% by mass, a potassium content of 0.02-0.1% by mass, and a chlorine content of 0.5-1.5% by mass, relative to the amount of the alumina carrier.

In a preferred embodiment, the specific surface area of the alumina carrier is 120-220 $m^2/g$, and more preferably 140-190 $m^2/g$. The alumina carrier may be in various shapes, such as shapes of strip and sphere, preferably the shape of sphere, with the diameter of the sphere carrier being preferably 1.5-2.0 mm. The alumina is preferably γ-alumina.

The dehydrogenation catalyst may be prepared by methods conventionally used in the art. In a preferred embodiment, the dehydrogenation catalyst may be prepared by a method comprising the following steps: impregnating an alumina carrier containing a Group IVA metal (e.g., tin) with an aqueous solution containing a platinum compound and a halide of a Group IA metal (e.g., chloride), subjecting the impregnated solid to drying, activation with water and chlorine, and reduction to obtain the target catalyst. Preferably, the platinum-containing compound is chloroplatinic acid.

In a further preferred embodiment, in the above method for catalyst preparation, the impregnation temperature is 10-50° C., the drying temperature is 90-150° C., and the drying time is preferably 8-24 hours. The activation with water and chlorine is carried out by treating the dried solid under an air atmosphere containing moisture and HCl, at a temperature of preferably 460-540° C., for a period of preferably 2-12 hours, and at a molar ratio of water/HCl of preferably 10-100:1. The reduction is carried out using a reducing gas that is preferably hydrogen, at reduction temperature of preferably 480-520° C., for a period of preferably 2-12 hours.

According to the present application, step 2) allows the $C_9^+$ aromatic hydrocarbon in the reaction product of the step 1) to be converted into light aromatic hydrocarbon by removing pendant alkyl group. Meanwhile, if $C_6$-$C_8$ paraffinic hydrocarbon is present in the reaction product in the step 1), the step 2) may also allow the $C_6$-$C_8$ paraffinic hydrocarbon to undergo dehydrocyclization reaction and be directionally converted into light aromatic hydrocarbon with the same number of carbon atoms.

In a preferred embodiment, the reaction conditions of step 2) include: a temperature of 350-490° C., preferably 450-480° C., a pressure of 0.1-4.0 MPa, preferably 0.1-2.0 MPa, more preferably 0.1-0.5 MPa, a mass space velocity of the $C_9^+$ aromatic hydrocarbon-containing stream of 1-20 $h^{-1}$, preferably 1-10 $h^{-1}$, and a hydrogen-to-hydrocarbon molar ratio of 0.5-20:1, preferably 1-10:1.

In a further preferred embodiment, the second reaction zone comprises one reactor or a plurality (e.g. 2 to 3) of reactors connected in series, preferably one reactor or 2 reactors connected in series, and in the second reaction zone, the mass space velocity of the stream comprising $C_9^+$ aromatic hydrocarbon may be 1-20 $h^{-1}$, preferably 1-10 $h^{-1}$, more preferably 1-5 $h^{-1}$, and the hydrogen-to-hydrocarbon molar ratio may be 0.5-20:1, preferably 1-10:1, wherein in the case that a plurality of reactors are used, the mass space velocity is calculated relative to the total amount of catalyst used in all reactors of the second reaction zone and the hydrogen-to-hydrocarbon molar ratio refers to that at the inlet of the first reactor.

In a preferred embodiment, the characteristics of the dealkylation catalyst used in step 2) are as described above in the first aspect and will not be described in detail here.

In a preferred embodiment, the mass ratio of the dehydrogenation catalyst used in step 1) to the dealkylation catalyst used in step 2) is 1:(0.25-5), preferably 1:(1.2-3).

In the method of the present application, the reactions for converting hydrocarbons into aromatic hydrocarbons in the above-mentioned reactions of step 1) and step 2) are endothermic reactions, and in order to maintain a temperature required for the reactions, it is preferable to provide an intermediate heater between the first and second reaction zones and between the reactors connected in series in the respective reaction zones. The reactors suitable for steps 1) and 2) of the method according to the present application can be fixed bed reactors or moving bed reactors, preferably fixed bed reactors.

In some preferred embodiments of the method of the present application, the feedstock comprising $C_9^+$ paraffinic hydrocarbon used in step 1) is naphtha, which may be selected, for example, from the group consisting of straight run naphtha, hydrocracked heavy naphtha, hydrotreated coking gasoline, raffinate of ethylene pyrolysis gasoline, catalytic cracking gasoline, and mixtures thereof. In a further preferred embodiment, the naphtha comprises naphthenic hydrocarbons having 6 to 12 carbon atoms, paraffinic hydrocarbons having 6 to 12 carbon atoms and aromatic hydrocarbons having 6 to 12 carbon atoms, and has an initial boiling point of 80-95° C. and a final boiling point of 135-180° C. Due to the accuracy of rectification separation, the naphtha may also comprise a small amount of $C_5$ hydrocarbon(s), typically in an amount of no more than 0.5% by mass. To ensure that the final boiling point of the reaction product meets the requirements of gasoline blending, the amount of hydrocarbons having more than 11 carbon atoms ($C_{11}^+$) present in the naphtha is typically not more than 1% by mass.

In such preferred embodiment, naphtha is passed into the first reaction zone, and in step 1), the reaction conditions are controlled to perform moderate dehydrogenation conversion reaction, so that naphthenic hydrocarbons present therein undergo dehydrogenation reaction to generate aromatic hydrocarbons with the same number of carbon atoms, and $C_9^+$ paraffinic hydrocarbons undergo dehydrocyclization reaction to be converted into aromatic hydrocarbons with the same number of carbon atoms, as well, while as few $C_7^-$ paraffinic hydrocarbons undergo dehydrocyclization or cracking reaction as possible; then, the reaction product in the first reaction zone is directly fed into the second reaction zone without separation, $C_9^+$ aromatic hydrocarbons in the reaction product is subjected to removal of pendant alkyl group in step 2) and converted into light aromatic hydrocarbons, such as BTX, and meanwhile unreacted $C_6$-$C_8$ paraffinic hydrocarbons present therein undergo dehydrocyclization reaction to generate aromatic hydrocarbons with corresponding number of carbon atoms. The method of such preferred embodiment can convert paraffinic hydrocarbons in naphtha into aromatic hydrocarbons more efficiently through directional reaction, and dealkylate $C_9^+$ aromatic hydrocarbons to produce light aromatic hydrocarbons, such as BTX, thereby increasing the yield of light aromatic hydrocarbons.

In such preferred embodiment, step 1) is mainly used to conduct dehydrogenation conversion of naphtha by dehydrogenating naphthenic hydrocarbons, which are more reactive, in naphtha to form aromatic hydrocarbons during the dehydrogenation conversion process, and control the conversion of paraffinic hydrocarbons so that $C_9^+$ paraffinic hydrocarbons, which are relatively more reactive, undergo dehydrocyclization reaction, while as few $C_7^-$ paraffinic hydrocarbons are converted as possible. During the dehydrogenation conversion process of step 1), the conversion of $C_7^-$ paraffinic hydrocarbons is controlled and the cracking reaction of light hydrocarbons is also controlled, so that the $C_6$-$C_8$ paraffin content is maintained and the content of light aromatic hydrocarbons of the final reaction product is also increased.

In some further preferred embodiments, the naphtha is subjected to a hydrofining treatment to remove therefrom impurities like arsenic, lead, copper, sulfur and nitrogen before being sent to the first reaction zone, and after the hydrotreatment, the naphtha is typically free of olefins.

In some further preferred embodiments, in step 1), the conversion rate of naphthenic hydrocarbons in the naphtha is controlled to be not less than 90% by mass and the conversion rate of $C_9^+$ paraffinic hydrocarbons in the naphtha is controlled to be 70-95% by mass. Preferably, such control can be achieved by selecting appropriate reaction conditions, such as adjusting the reaction temperature or feeding mass space velocity of naphtha, etc., or by varying the content of Group IA metals, such as potassium, in the dehydrogenation catalyst to adjust the reaction selectivity of the dehydrogenation catalyst, and the like.

In a still further preferred embodiment, in step 1), the conversion rate of naphthenic hydrocarbons in the naphtha is controlled to be not less than 90% by mass, wherein the conversion rates of both $C_7$ and $C_8$ naphthenic hydrocarbons are not less than 95% by mass, and the conversion rate of $C_6$ naphthenic hydrocarbons is not less than 70% by mass. Preferably, the control can be achieved by selecting an appropriate reaction temperature or an appropriate feeding space velocity of naphtha, etc.

In a still further preferred embodiment, in step 1), the conversion rate of paraffinic hydrocarbons in the naphtha is controlled to be not more than 60% by mass, wherein the conversion rate of $C_6$ paraffinic hydrocarbons is not more than 18% by mass, the conversion rate of $C_7$ paraffinic hydrocarbons is not more than 30% by mass, the conversion rate of $C_8$ paraffinic hydrocarbons is not more than 70% by mass, and the conversion rate of $C_9^+$ paraffinic hydrocarbons is 70-95% by mass. Preferably, the control can be achieved by varying the content of Group IA metals, such as potassium, in the dehydrogenation catalyst to adjust the dehydrocyclization reaction selectivity, and the like.

The preferred embodiments of the present application will be further described with reference to the accompanying drawings.

The FIGURE is a schematic flow diagram of a preferred embodiment of the method of the present application. As shown in the FIGURE, a pre-hydrofined naphtha is mixed via pipeline 101 with hydrogen introduced via pipeline 102, which has been pressurized by a circulating hydrogen compressor, and then passed to a feed heat exchanger 103, where it is heat exchanged with the reaction product from the second reaction zone via pipeline 112 and passed via pipeline 104 to feed heater 105; after being heated, the mixture is passed to a first reaction zone 107 through pipeline 106 for reaction in the presence of a dehydrogenation catalyst, where naphthenic hydrocarbons in the naphtha are dehydrogenated and converted into aromatic hydrocarbons, $C_9^+$ paraffinic hydrocarbons are dehydrocyclized to generate $C_9^+$ aromatic hydrocarbons. The reaction product from the first reaction zone 107 is passed to an intermediate heater 109 through pipeline 108, heated and then sent to a second reaction zone 111 through pipeline 100 for reaction in the presence of a dealkylation catalyst, where pendant alkyl group of $C_9^+$ aromatic hydrocarbons are removed to generate light aromatic hydrocarbons (such as BTX), and $C_6$-$C_8$ paraffinic hydrocarbons are dehydrocyclized to generate light aromatic hydrocarbons. The reaction product from the second reaction zone is passed to the feed heat exchanger 103 through pipeline 112, cooled by exchanging heat with the naphtha, and then passed to a gas-liquid separator 114 through pipeline 113 for gas-liquid separation. The separated liquid phase is discharged through pipeline 117, and passed to a product recontacting and separating unit to produce a light aromatic product; the separated gas phase is divided into two parts, one part is sent to the inlet of the circulating hydrogen compressor through pipeline 115, pressurized, and then mixed with the naphtha feedstock from pipeline 101 through pipeline 102, and the other part is discharged through pipeline 116, passed to a re-contact tank (not shown) after being pressurized by a compressor, mixed and cooled with the liquid phase from pipeline 117, and subjected to separation by gas-liquid equilibrium flash vaporization again, most of hydrocarbons in the gas phase are condensed to the liquid phase, and then the gas phase is discharged out of the system as a hydrogen product.

For simplicity, other equipment used in the above preferred embodiment of the method of the present application, such as naphtha feeding pump, air cooler for reaction product, bottom pump of the gas-liquid separator, etc., are not shown in the FIGURE.

In some preferred embodiments, the present application provides the following technical solutions:

1. A method for producing light aromatic hydrocarbons from naphtha, comprising the steps of:
    (1) feeding naphtha into a first reaction zone, contacting it with a dehydrogenation catalyst to perform dehydrogenation conversion reaction, to obtain a conversion rate of naphthenic hydrocarbons in the naphtha of not less than 90% by mass, and a conversion rate of $C_9^+$ paraffinic hydrocarbons of 70-95% by mass,
    (2) feeding the reaction product of the first reaction zone into a second reaction zone and contacting it with a dealkylation catalyst, to perform dealkylation reaction of $C_9^+$ aromatic hydrocarbons and dehydrocyclization reaction of $C_6$-$C_8$ paraffinic hydrocarbons, to obtain light aromatic hydrocarbons.

2. The method according to Item 1, wherein in step (1), the conversion rate of naphthenic hydrocarbons present in the naphtha is not less than 90% by mass in the dehydrogenation reaction, wherein the conversion rates of both $C_7$ and $C_8$ naphthenic hydrocarbons in the dehydrogenation reaction are not less than 95% by mass, and the conversion rate of $C_6$ naphthenic hydrocarbons in the dehydrogenation reaction is not less than 70% by mass.

3. The method according to Item 1, wherein in step (1), the conversion rate of paraffinic hydrocarbons in the dehydrocyclization reaction is not more than 60% by mass, wherein the conversion rate of $C_6$ paraffinic hydrocarbons is not more than 18% by mass, the conversion rate of $C_7$ paraffinic hydrocarbons is not more than 30% by mass, and the conversion rate of $C_8$ paraffinic hydrocarbons is not more than 70% by mass.

4. The method according to Item 1, wherein the dehydrogenation catalyst used in step (1) comprises an alumina carrier and, relative to the amount of the carrier, 0.1-2.0% by mass of platinum, 0.1-2.0% by mass of tin, 0.01-0.2% by mass of a Group IA metal and 0.3-5% by mass of chlorine.

5. The method of Item 4, wherein the alumina is γ-alumina and the Group IA metal is potassium.

6. The method according to Item 1, wherein the dehydrogenation conversion reaction of step (1) is carried out at a temperature of 400-500° C. and a pressure of 0.1-4.0 MPa.

7. The method according to Item 1 or 6, wherein the dehydrogenation conversion reaction zone involved in step (1) comprises 1 to 5 reactors connected in series, the mass space velocity of naphtha fed into the dehydrogenation conversion reaction zone is 1-50 h$^{-1}$, and the hydrogen-to-hydrocarbon molar ratio in the dehydrogenation-conversion reaction zone is 0.5-20:1.

8. The method according to Item 1, wherein the dealkylation catalyst used in step (2) comprises a KL zeolite and, supported thereon, 0.1-1.5% by mass of platinum and 0.02-4.0% by mass of a Group IIA metal, relative to the amount of the KL zeolite.

9. The method according to Item 8, wherein the Group IIA metal is barium or calcium.
10. The method according to Item 1, wherein in the second reaction zone involved in step (2), the temperature is 350-490° C., and the pressure is 0.1-4.0 MPa.
11. The method according to Item 1 or 10, wherein the second reaction zone involved in step (2) comprises 1 to 3 reactors connected in series, the mass space velocity of the reaction product of the first reaction zone into the second reaction zone is 1-20 h$^{-1}$, and the hydrogen-to-hydrocarbon molar ratio of the second reaction zone is 0.5-20:1.
12. The method according to Item 1, wherein the mass ratio of the dehydrogenation catalyst to the dealkylation catalyst is 1:(0.25-5).

EXAMPLES

The present application will now be further illustrated with reference to the following examples, but is not to be construed as being limited thereto.

Catalyst Preparation Examples

Example I-1

This example illustrates the preparation of a dehydrogenation catalyst used in the present application.
(1) Preparation of Tin-Containing γ-Al$_2$O$_3$ Pellets with a Uniform Distribution of Tin
100 g of aluminum hydroxide powder (available from Sasol Limited, German, under the trade name of SB, with an alumina content of 72% by mass) and an appropriate amount of deionized water were stirred and slurried to obtain a slurry with a liquid/solid mass ratio of 2.0. 7.5 ml of dilute nitric acid with a volume ratio of 1:1, 30 g of urea and a predetermined amount of hydrochloric acid solution of SnCl$_2$ were added into the slurry to obtain a Sn content in the solution of 0.30% by mass relative to the dry weight of alumina, and stirred for 1 hour. 30 g of kerosene and 3 g of fatty alcohol-polyoxyethylene ether were added, and the resultant was stirred for 1 hour, and subjected to droplet forming in an oil-ammonia column. The droplets were solidified in ammonia water for 1 hour, then filtered, washed with deionized water for 2 to 3 times, dried for 6 hours at 60° C., dried for 10 hours at 120° C., and calcined for 4 hours at 680° C. in air, wherein the moisture content in the calcining atmosphere was 15 vol %, to obtain a γ-Al$_2$O$_3$ pellet carrier containing Sn, which had an average diameter of 1.62 mm, and a specific surface area measured by BET method of 165 m$^2$/g.
(2) Preparation of the Target Catalyst
0.5882 g of chloroplatinic acid, 0.1526 g of potassium chloride, 5.40 g of hydrochloric acid with a concentration of 37% by mass and 175 g of deionized water were formulated into a solution, wherein the content of HCl was 2.0% by mass relative to the dry weight of the alumina carrier. The Sn-containing γ-Al$_2$O$_3$ pellet carrier obtained in step (1) was impregnated with the above obtained solution as an impregnation solution at 25° C. for 4 hours, with a liquid/solid ratio of 1.8 mL/g. After impregnation, the impregnation system was evaporated to dryness using a rotary evaporator, the resulting solid was dried at 120° C. for 12 hours, and activated with water and chlorine at 510° C. for 4 hours, wherein the molar ratio of water to HCl in the air used for the activation was 40:1, then the resultant was reduced with hydrogen at 500° C. for 4 hours, to obtain a dehydrogenation catalyst A.

The catalyst A comprises the following components: 0.27% by mass of Pt, 0.30% by mass of Sn, 0.08% by mass of K, 1.0% by mass of Cl, relative to the amount of the alumina carrier, with the contents of each element being measured by X-ray fluorescence analysis.

Example I-2

This example illustrates the preparation of a Pt—Ba/KL dealkylation catalyst used in the present application.
(1) Preparation of the Template Agent for the Synthesis of KL Zeolite
12.08 g of Al(OH)$_3$ (available from Aluminum Corporation Of China Limited under a trade name of H—WF-10, the same below) was added to 264.12 ml of a solution containing 77.57 g of KOH (with a purity of 85.7% by mass, the same below), and the mixture was dissolved by heating to obtain an aluminum sol. The aluminum sol was added under stirring to 435.6 g of silica sol (containing 30% by mass of SiO$_2$, with a pH of 9, the same below) preheated to 50° C., stirred for 0.5 hour to form a white gel, and the white gel was aged at 30° C. for 72 hours to obtain a translucent sol as the target template agent, which had a molar ratio between the components thereof of K$_2$O:Al$_2$O$_3$:SiO$_2$:H$_2$O=7.9:1:29:430.
(2) Preparation of KL Zeolite Carrier
107 g of Al(OH)$_3$ was added to 1100 mL of a solution containing 210 g of KOH, and dissolved by heating to obtain an aluminum sol. The resulting aluminum sol and the template agent obtained in step (1) were added into a reaction kettle containing 1200 mL of silica sol under stirring, wherein the molar ratio of Al$_2$O$_3$ contained in the template agent to Al$_2$O$_3$ contained in materials other than the template agent was 5:95, the resultant was stirred for 0.5 hours to obtain a reaction mixture of white gel, which had a molar ratio between the components thereof of K$_2$O:Al$_2$O$_3$:SiO$_2$:H$_2$O=2.68:1:10:178.

The white gel was heated to 150° C. under stirring, then the stirring was stopped, and the resultant was subjected to static crystallization for 72 hours, the resulting crystallized product was quickly cooled to 40° C., separated by centrifuging, the supernatant liquor was taken out, the solid was washed with deionized water until the pH value of the liquid phase was 9-10, and the resulting solid was dried at 120° C. for 10 hours, to obtain KL zeolite, which had a molar ratio of the components thereof of K$_2$O:Al$_2$O$_3$:SiO$_2$=1.2:1:5.6, and an average grain diameter of 0.3-1.2 μm.
(3) Preparation of Pt—Ba/KL Catalyst
1.54 g of Pt(NH$_3$)$_2$Cl$_2$ and 1.52 g of BaCl$_2$ were dissolved in 150 g of deionized water, thoroughly and uniformly stirred, to obtain an impregnation solution. The above impregnation solution was added into 100 g of the KL zeolite carrier obtained in step (2), impregnated for 6 hours, then rotationally evaporated to dryness, the resulting solid was dried at 120° C. for 12 hours, and calcined in air at 350° C. for 4 hours, to obtain Pt—Ba/KL zeolite, designated as catalyst B. The catalyst B has a Pt content of 1.0% by mass and a Ba content of 1.0% by mass, relative to the amount of the KL zeolite.

Example I-3

This example illustrates the preparation of a Pt—Ca/KL dealkylation catalyst used in the present application.
1.54 g of Pt(NH$_3$)$_2$Cl$_2$ and 2.78 g of CaCl$_2$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—Ca/KL zeolite, designated as catalyst B1. The catalyst B1 has a Pt content of 1.0% by mass and a Ca content of 1.0% by mass, relative to the amount of the KL zeolite.

Example I-4

This example illustrates the preparation of a Pt—La/KL dealkylation catalyst used in the present application.

1.54 g of $Pt(NH_3)_2Cl_2$ and 1.77 g of $LaCl_3$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—La/KL zeolite, designated as catalyst B2. The catalyst B2 has a Pt content of 1.0% by mass and a La content of 1.0% by mass, relative to the amount of the KL zeolite.

Example I-5

This example illustrates the preparation of a Pt—Ce/KL dealkylation catalyst used in the present application.

1.54 g of $Pt(NH_3)_2Cl_2$ and 1.76 g of $CeCl_3$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—Ce/KL zeolite, designated as catalyst B3. The catalyst B3 has a Pt content of 1.0% by mass and a Ce content of 1.0% by mass, relative to the amount of the KL zeolite.

Example I-6

This example illustrates the preparation of a Pt—Yb/KL dealkylation catalyst used in the present application.

1.54 g of $Pt(NH_3)_2Cl_2$ and 1.62 g of $YbCl_3$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—Yb/KL zeolite, designated as catalyst B4. The catalyst B4 has a Pt content of 1.0% by mass and a Yb content of 1.0% by mass, relative to the amount of the KL zeolite.

Example I-7

This example illustrates the preparation of another Pt—Ba/KL dealkylation catalyst used in the present application.

1.26 g of $Pt(NH_3)_2Cl_2$ and 1.52 g of $BaCl_2$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—Ba/KL zeolite, designated as catalyst B5. The catalyst B5 has a Pt content of 0.82% by mass and a Ba content of 1.0% by mass, relative to the amount of the KL zeolite.

Example I-8

This example illustrates the preparation of another Pt—Ba/KL dealkylation catalyst used in the present application.

0.62 g of $Pt(NH_3)_2Cl_2$ and 0.30 g of $BaCl_2$ were dissolved in 150 g of deionized water, thoroughly and uniformly stirred, to obtain an impregnation solution. The above impregnation solution was added to 100 g of the KL zeolite carrier obtained in Example I-2, impregnated for 6 hours, then rotationally evaporated to dryness, and the resulting solid was dried at 120° C. for 12 h and calcined at 350° C. in air for 4 h, to obtain Pt—Ba/KL zeolite, designated as catalyst B6. The catalyst B6 has a Pt content of 0.4% by mass and a Ba content of 0.2% by mass, relative to the amount of the KL zeolite.

Comparative Example I-1

This comparative example illustrates the preparation of a Pt/KL zeolite catalyst different from that used in the present application.

90 g of the KL zeolite powder obtained in step (2) of Example I-2 was uniformly mixed with 10 g of amorphous silica powder, and an appropriate amount of an aqueous sodium hydroxide solution was added thereto and kneaded to obtain a moisture content of 40% by mass, and then the mixture was extruded on an extruder and calcined at 400° C. to obtain a shaped KL zeolite carrier.

1.14 g of $Pt(NH_3)_2Cl_2$ was dissolved in 150 g of deionized water, thoroughly and uniformly stirred, to obtain an impregnation solution. The above impregnation solution was added to the shaped KL zeolite carrier, impregnated for 6 hours, then rotationally evaporated to dryness, the resulting solid was dried at 120° C. for 12 hours, and calcined at 350° C. in air for 4 hours, to obtain Pt/KL zeolite, designated as catalyst R. The catalyst R has a Pt content of 0.82% by mass, relative to the amount of the KL zeolite.

Comparative Example I-2

This comparative example illustrates the preparation of a Pt/KL zeolite catalyst different from that used in the present application.

A Pt/KL zeolite catalyst was prepared as described in Example I-2, except that the impregnation solution used in step (3) did not contain $BaCl_2$ and the Pt/KL zeolite obtained was designated as catalyst R1. The catalyst R1 has a Pt content of 1.0% by mass, relative to the amount of the KL zeolite.

Comparative Example I-3

This comparative example illustrates the preparation of a Pt/KL zeolite catalyst different from that used in the present application.

A Pt/KL zeolite catalyst was prepared as described in Example I-8, except that the impregnation solution used did not contain $BaCl_2$ and the Pt/KL zeolite obtained was designated as catalyst R2. The catalyst R2 has a Pt content of 0.4% by mass, relative to the amount of the KL zeolite.

Application Examples

Example II-1

This example illustrates the application of the method according to the first aspect of the present application.

30 g of the catalyst B obtained in Example I-2 was charged into a fixed bed reactor and dealkylation reaction was carried out using $C_9^+$ aromatic hydrocarbons as the feedstock. The $C_9^+$ aromatic hydrocarbons used were obtained by rectification of conventional reformate and the properties and composition thereof are shown in Tables II-1 and II-2. The reaction temperature, pressure, mass space velocity and hydrogen-to-hydrocarbon molar ratio used in this example, as well as the reaction results, are shown in Table II-3.

TABLE II-1

Properties of the $C_9^+$ aromatic hydrocarbons used in the examples

| Item | Initial boiling point | 10 vol % | 50 vol % | 90 vol % | Final boiling point |
|---|---|---|---|---|---|
| Distillation temperature, ° C. | 149.8 | 161.9 | 167.5 | 179.9 | 202.3 |

TABLE II-2

Composition of the $C_9^+$ aromatic hydrocarbons used in the examples

| Carbon number of hydrocarbon | Paraffinic hydrocarbons, % by mass | Naphthenic hydrocarbons, % by mass | Aromatic hydrocarbons, % by mass |
|---|---|---|---|
| $C_7$ | 0.02 | 0.01 | 0.06 |
| $C_8$ | 0.01 | 0.01 | 0.58 |
| $C_9$ | 0.00 | 0.00 | 76.09 |
| $C_{10}$ | 0.00 | 0.00 | 21.46 |
| $C_{11}^+$ | 0.00 | 0.00 | 1.76 |

TABLE II-2-continued

Composition of the $C_9^+$ aromatic hydrocarbons used in the examples

| Carbon number of hydrocarbon | Paraffinic hydrocarbons, % by mass | Naphthenic hydrocarbons, % by mass | Aromatic hydrocarbons, % by mass |
|---|---|---|---|
| Total | 0.03 | 0.02 | 99.95 |

Example II-2

An experiment was conducted as described in Example II-1, except that the reactor was charged with the catalyst B1 obtained in Example I-3, and the reaction conditions and results are shown in Table II-3.

Example II-3

An experiment was conducted as described in Example II-1, except that the reactor was charged with the catalyst B2 obtained in Example I-4, and the reaction conditions and results are shown in Table II-3.

Example II-4

An experiment was conducted as described in Example II-1, except that the reactor was charged with the catalyst B6 obtained in Example I-8, and the reaction conditions and results are shown in Table II-3.

Comparative Example II-1

This comparative example illustrates the results obtained using a KL zeolite catalyst other than that of the present application.

An experiment was conducted as described in Example II-1, except that the reactor was charged with the catalyst R1 obtained in Comparative Example I-2, and the reaction conditions and results are shown in Table II-3.

Comparative Example II-2

This comparative example illustrates the results obtained using a KL zeolite catalyst other than that of the present application.

An experiment was conducted as described in Example II-1, except that the reactor was charged with the catalyst R2 obtained in Comparative Example I-3, and the reaction conditions and results are shown in Table II-3.

TABLE II-3

Reaction conditions and results for Examples II-1 to II-4 and Comparative Examples II-1 to II-2

| Item | Ex. II-1 | Ex. II-2 | Ex. II-3 | Comp. Ex. II-1 | Ex. II-4 | Comp. Ex. II-2 |
|---|---|---|---|---|---|---|
| Reaction temperature, ° C. | 470 | 470 | 470 | 470 | 470 | 470 |
| Dealkylation catalyst | B | B1 | B2 | R1 | B6 | R2 |
| Mass space velocity of feedstock, $h^{-1}$ | 1.3 | 1.3 | 1.3 | 1.3 | 1.3 | 1.3 |
| Molar ratio of hydrogen to $C_9^+$ aromatic hydrocarbons | 6:1 | 6:1 | 6:1 | 6:1 | 6:1 | 6:1 |
| Reaction pressure, MPa | 0.45 | 0.45 | 0.45 | 0.45 | 0.45 | 0.45 |
| Conversion rate of feedstock, % by mass | 89.43 | 88.58 | 86.74 | 83.68 | 80.85 | 78.94 |
| Yield of light aromatic hydrocarbons, % by mass | 71.05 | 69.24 | 67.85 | 63.27 | 61.06 | 59.19 |
| Product selectivity to light aromatic hydrocarbons, % by mass | 79.45 | 78.17 | 78.22 | 75.61 | 75.52 | 74.98 |

As can be seen from the results listed in Table II-3, where dealkylation reaction was carried out according to the method of the present application using $C_9^+$ aromatic hydrocarbons as the feedstock and catalysts with the same Pt content, Examples II-1 to II-3 using catalysts B, B1 and B2 all showed higher conversion rate of feedstock, and higher yield and selectivity of light aromatic hydrocarbons than Comparative Example II-1, thereby achieving the goal of converting $C_9^+$ aromatic hydrocarbons to light aromatic hydrocarbons as much as possible; while Example II-4 using catalyst B6 also showed improved conversion rate of feedstock, and improved yield and selectivity of light aromatic hydrocarbons over Comparative Example II-2.

Examples III-1 to III-3

These examples illustrate the application of step 1) of the method according to the second aspect of the present application.

15 g of the catalyst A obtained in Example I-1 was charged in a small fixed-bed reactor and dehydrogenation conversion reaction of naphtha was conducted under different reaction conditions. The properties and composition of the naphtha used are shown in Tables III-1 and III-2, and the reaction conditions and results of the examples are shown in Table III-3.

TABLE III-1

Properties of the naphtha used in the examples

| Item | Initial boiling point | 10 vol % | 50 vol % | 90 vol % | Final boiling point |
|---|---|---|---|---|---|
| Distillation temperature, ° C. | 84 | 106 | 121 | 153 | 170 |

TABLE III-2

Composition of the naphtha used in the examples

| Carbon number of hydrocarbon | Paraffinic hydrocarbons, % by mass | Naphthenic hydrocarbons, % by mass | Aromatic hydrocarbons, % by mass |
|---|---|---|---|
| $C_5$ | 0.15 | 0.03 | — |
| $C_6$ | 3.43 | 3.17 | 0.38 |
| $C_7$ | 9.34 | 10.46 | 2.76 |
| $C_8$ | 15.92 | 13.95 | 6.51 |
| $C_9$ | 10.83 | 11.37 | 2.92 |
| $C_{10}$ | 6.40 | 1.84 | 0.16 |
| $C_{11}^+$ | 0.38 | 0 | 0 |
| Total | 46.45 | 40.82 | 12.73 |

Comparative Example III-1

This comparative example illustrates the results of existing continuous reforming techniques.

15 g of reforming catalyst C (available from Hunan Jianchang Petrochemical Co., Ltd. under the trade name RC011) was charged into a small fixed-bed reactor. Naphtha having the properties and composition listed in Tables III-1 and III-2 was passed to the reactor for catalytic reforming. The reforming catalyst C comprises a carrier of $\gamma$-$Al_2O_3$ pellets, and has a Pt content of 0.28% by mass, a Sn content of 0.31% by mass, and a chlorine content of 1.10% by mass, relative to the amount of the carrier. The reaction temperature, pressure, mass space velocity and hydrogen-to-hydrocarbon molar ratio used in this comparative example, and the reaction results are shown in Tables III-3 and III-4.

TABLE III-3

Reaction conditions and results for Examples III-1 to III-3 and Comparative Example III-1

| Item | Ex. III-1 | Ex. III-2 | Ex. III-3 | Comp. Ex. III-1 |
|---|---|---|---|---|
| Reaction temperature, ° C. | 460 | 470 | 500 | 520 |
| Reaction pressure, MPa | 0.45 | 0.45 | 0.45 | 0.45 |
| Mass space velocity, $h^{-1}$ | 2.6 | 2.6 | 10.4 | 2.6 |
| Hydrogen-to-hydrocarbon molar ratio | 6:1 | 6:1 | 6:1 | 6:1 |
| Conversion of $C_6$ naphthenes, % by mass | 74.85 | 79.73 | 87.17 | 94.83 |
| Conversion of $C_7$ naphthenes, % by mass | 96.92 | 97.58 | 98.67 | 98.86 |
| Conversion of $C_8$ naphthenes, % by mass | 96.61 | 96.97 | 97.68 | 99.58 |
| Conversion of $C_9^+$ naphthenes, % by mass | 90.11 | 92.88 | 96.88 | 99.27 |
| Total conversion of naphthenes, % by mass | 91.95 | 93.72 | 96.05 | 98.09 |
| Conversion of $C_6$ paraffins, % by mass | 12.47 | 12.80 | 16.99 | 36.47 |
| Conversion of $C_7$ paraffins, % by mass | 17.13 | 23.00 | 27.73 | 70.87 |
| Conversion of $C_8$ paraffins, % by mass | 43.91 | 53.03 | 67.56 | 94.97 |
| Conversion of $C_9^+$ paraffins, % by mass | 71.86 | 79.60 | 90.57 | 99.38 |
| Total conversion of paraffins, % by mass | 42.82 | 47.83 | 57.53 | 76.54 |
| Liquid yield, % by mass | 91.00 | 90.33 | 88.64 | 84.46 |
| Total yield of aromatics, % by mass | 59.92 | 63.45 | 66.67 | 70.68 |
| Yield of light aromatics, % by mass | 38.86 | 41.43 | 43.18 | 51.96 |
| Yield of $C_9^+$ aromatics, % by mass | 21.06 | 22.02 | 23.49 | 18.72 |

From the results listed in Table III-3, it can be seen that, by subjecting the naphtha to the dehydrogenation conversion reaction in step 1) of the method of the present application, a total conversion rate of naphthenic hydrocarbons of more than 90% by mass, a conversion rate of $C_9^+$ paraffinic hydrocarbons of more than 70% by mass but less than 95% by mass, and a conversion rate of $C_7^-$ paraffinic hydrocarbons of less than 28% by mass are obtained in the product, indicating that, in the naphtha, the naphthenic hydrocarbons are substantially dehydrogenated, $C_9^+$ paraffinic hydrocarbons are dehydrocyclized and directionally converted to aromatic hydrocarbons with the same number of carbon atoms, while dehydrocyclization and cracking reactions of $C_7^-$ paraffinic hydrocarbons are prevented.

Examples III-4 to III-7

These examples illustrate the application of the method according to the second aspect of the present application.

According to the scheme shown in the FIGURE, naphtha having the properties and composition shown in Table III-1 and Table III-2 was used as a feedstock to carry out the reaction.

15 g of the catalyst A obtained in Example I-1 was charged into a fixed bed reactor a used in the first reaction zone 107, 30 g of the catalyst B obtained in Example I-2 was charged into a fixed bed reactor b used in the second reaction zone 111, naphtha was fed into the fixed bed reactor a to conduct a dehydrogenation conversion reaction, and the resulting product was fed into the fixed bed reactor b for further reaction. The reaction conditions and results of the examples are shown in Table III-4.

Example III-8

This example illustrates the results of the application of the method according to the first aspect of the present application to the treatment of naphtha.

30 g of the catalyst B obtained in Example I-2 was charged into a small fixed bed reactor, and naphtha having the properties and composition as shown in Table III-1 and Table III-2 was fed into the reactor for reaction. The reaction conditions and results are shown in Table III-4.

Example III-9

This example illustrates the application of the method according to the second aspect of the present application.

According to the scheme shown in the FIGURE, naphtha having the properties and composition shown in Table III-1 and Table III-2 was used as a feedstock to carry out the reaction.

15 g of the catalyst A obtained in Example I-1 was charged into a fixed bed reactor a used in the first reaction zone 107, 30 g of the catalyst B1 obtained in Example I-3 was charged into a fixed bed reactor b used in the second reaction zone 111, naphtha was fed into the fixed bed reactor a to carry out the dehydrogenation reaction under the reaction conditions of Example III-4, and the resulting

TABLE III-4

Results of Examples III-4 to III-8 and Comparative Example III-1

| Item | Ex. III-4 | Ex. III-5 | Ex. III-6 | Ex. III-7 | Comp. Ex. III-1 | Ex. III-8 |
|---|---|---|---|---|---|---|
| Reaction temperature of the first reaction zone, ° C. | 470 | 470 | 460 | 500 | 520 | — |
| Reaction temperature of the second reaction zone, ° C. | 450 | 470 | 470 | 470 | — | 470 |
| Feeding mass space velocity of the first reaction zone, $h^{-1}$ | 2.6 | 2.6 | 2.6 | 2.6 | 2.6 | — |
| Feeding mass space velocity of the second reaction zone, $h^{-1}$ | 1.3 | 1.3 | 1.3 | 1.3 | — | 1.3 |
| Hydrogen-to-hydrocarbon molar ratio at the inlet of the first reaction zone | 6:1 | 6:1 | 6:1 | 6:1 | 6:1 | 6:1 |
| Reaction pressure, MPa | 0.45 | 0.45 | 0.45 | 0.45 | 0.45 | 0.45 |
| Liquid yield, % by mass | 79.38 | 75.12 | 78.77 | 73.17 | 84.46 | 78.92 |
| Total yield of aromatics, % by mass | 72.14 | 71.54 | 70.99 | 70.62 | 70.68 | 70.87 |
| Yield of light aromatics, % by mass | 63.45 | 66.12 | 64.77 | 65.58 | 51.96 | 62.76 |
| Yield of $C_9^+$ aromatics, % by mass | 8.69 | 5.42 | 6.22 | 5.04 | 18.72 | 8.11 |
| Gas yield, % by mass | 20.62 | 24.88 | 21.23 | 26.83 | 15.54 | 21.08 |
| Hydrogen content in the gas, % by mass | 19.56 | 14.75 | 18.42 | 14.06 | 24.11 | 16.18 |
| Methane content in the gas, % by mass | 20.52 | 37.70 | 30.29 | 32.49 | 7.87 | 39.08 |
| Content of $C_2$-$C_5$ hydrocarbons in the gas, % by mass | 59.92 | 47.55 | 51.29 | 53.45 | 68.02 | 44.74 |

As can be seen from the results listed in Table III-4, in the method according to the second aspect of the present application, the yield of light aromatic hydrocarbons is greatly increased and the yield of $C_9^+$ aromatic hydrocarbons is greatly decreased by subjecting naphtha to the conversion reaction in two reaction zones connected in series, i.e. the first and second reaction zones, as compared to existing continuous reforming process of Comparative Example III-1, thereby achieving the goal of producing light aromatic hydrocarbons from naphtha as much as possible, and the resulting gas still comprises a substantial amount of hydrogen.

Meanwhile, in Example III-8 using the method according to the first aspect of the present application, the yield of light aromatic hydrocarbons is greatly increased and the yield of $C_9^+$ aromatic hydrocarbons is greatly reduced, as compared to existing continuous reforming process of Comparative Example III-1, and thus the goal of producing light aromatic hydrocarbons from naphtha as much as possible is also achieved, and the resulting gas still comprises a substantial amount of hydrogen. By comparing the results of Examples III-5 to III-7 with those of Example III-8, it can be seen that the provision of dehydrogenation step 1) prior to dealkylation step 2) further improves the yield of light aromatic hydrocarbons and reduces the yield of $C_9^+$ aromatic hydrocarbons.

In addition, as can be seen from a comparison between the results in Table III-3 and those in Table III-4, the provision of dealkylation step 2) after dehydrogenation step 1) can greatly improve the yield of light aromatic hydrocarbons, and greatly reduce the yield of $C_9^+$ aromatic hydrocarbons.

product was fed into the fixed bed reactor b for further reaction. The reaction conditions and results of this example are shown in Table III-5.

Example III-10

An experiment was conducted as described in Example III-9, except that the reactor b was charged with the catalyst B2 obtained in Example I-4. The reaction conditions and results of this example are shown in Table III-5.

Example III-11

An experiment was conducted as described in Example III-9, except that the reactor b was charged with the catalyst B3 obtained in Example I-5. The reaction conditions and results of this example are shown in Table III-5.

Example III-12

An experiment was conducted as described in Example III-9, except that the reactor b was charged with the catalyst B4 obtained in Example I-6. The reaction conditions and results of this example are shown in Table III-5.

Example III-13

An experiment was conducted as described in Example III-9, except that the reactor b was charged with the catalyst B5 obtained in Example I-7. The reaction conditions and results of this example are shown in Table III-5.

Comparative Example III-2

This comparative example illustrates the results obtained using a KL zeolite catalyst other than that of the present application.

An experiment was conducted as described in Example III-9, except that the reactor b was charged with the catalyst R obtained in Comparative Example I-1. The reaction conditions and results of this comparative example are shown in Table III-5.

TABLE III-5

Reaction conditions and results for Examples III-9 to III-13 and Comparative Example III-2

| Item | Ex. III-9 | Ex. III-10 | Ex. III-11 | Ex. III-12 | Ex. III-13 | Comp. Ex. III-2 |
|---|---|---|---|---|---|---|
| Reaction temperature of the first reaction zone, ° C. | 470 | 470 | 470 | 470 | 470 | 470 |
| Dehydrogenation catalyst | A | A | A | A | A | A |
| Reaction temperature of the second reaction zone, ° C. | 470 | 470 | 470 | 470 | 470 | 470 |
| Dealkylation catalyst | B1 | B2 | B3 | B4 | B5 | R |
| Feeding mass space velocity of the first reaction zone, $h^{-1}$ | 2.6 | 2.6 | 2.6 | 2.6 | 2.6 | 2.6 |
| Feeding mass space velocity of the second reaction zone, $h^{-1}$ | 1.3 | 1.3 | 1.3 | 1.3 | 1.3 | 1.3 |
| Hydrogen-to-hydrocarbon molar ratio at the inlet of the first reaction zone | 6:1 | 6:1 | 6:1 | 6:1 | 6:1 | 6:1 |
| Reaction pressure, MPa | 0.45 | 0.45 | 0.45 | 0.45 | 0.45 | 0.45 |
| Liquid yield, % by mass | 75.68 | 76.25 | 76.57 | 76.73 | 78.61 | 80.14 |
| Total yield of aromatics, % by mass | 71.46 | 70.88 | 70.65 | 70.59 | 68.72 | 67.43 |
| Yield of light aromatics, % by mass | 65.94 | 65.23 | 65.31 | 65.18 | 61.79 | 57.96 |
| Yield of $C_9^+$ aromatics, % by mass | 5.52 | 5.65 | 5.34 | 5.41 | 6.93 | 9.47 |
| Gas yield, % by mass | 24.32 | 23.75 | 23.43 | 23.27 | 21.39 | 19.86 |

By comparing the results of Table III-5 and Table III-4, it can be seen that the yields of light aromatic hydrocarbons for Examples III-9 to III-13 are significantly higher than existing continuous reforming process of Comparative Example III-1, thereby achieving the goal of producing light aromatic hydrocarbons from naphtha as much as possible. Compared with Example III-5, the replacement of Ba in the dealkylation catalyst (catalyst B) with Ca, La, Ce and Yb (corresponding to the catalysts B1, B2, B3 and B4) in Examples III-9 to III-12 provides comparable yield of light aromatic hydrocarbons and total yield of aromatic hydrocarbons in the products; the adjustment of the Pt content in the dealkylation catalyst from 1.0% by mass (catalyst B) to 0.82% by mass (catalyst B5) in Example III-13 reduces the yield of light aromatic hydrocarbons and the total yield of aromatic hydrocarbons, but the yield of light aromatic hydrocarbons and the total yield of aromatic hydrocarbons are still higher than those obtained in Comparative Example III-2 using a KL zeolite catalyst (catalyst R) having a Pt content of 0.82% by mass and formed by binding with silica without adding a modifying metal.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A method for producing light aromatic hydrocarbons, comprising a step of contacting a $C_9^+$ aromatic hydrocarbon with a dealkylation catalyst in the presence of hydrogen to carry out a dealkylation reaction to obtain a light aromatic hydrocarbon, wherein the dealkylation catalyst comprises a KL zeolite, platinum, and a modifying metal supported on the KL zeolite, and the modifying metal is one or more selected from the group consisting of Group IIA metals and rare earth metals.

2. The method according to claim 1, wherein the dealkylation catalyst comprises the KL zeolite, 0.1-1.5% by mass of platinum, and 0.02-4.0% by mass of the modifying metal, relative to the amount of the KL zeolite.

3. The method according to claim 1, wherein
the rare earth metal is selected from the group consisting of La, Ce, Gd, Y, Sm, and Yb.

4. The method according to claim 1, wherein the dealkylation reaction is carried out at a temperature of 350-490° C., a pressure of 0.1-4.0 MPa, a mass space velocity of $C_9^+$ aromatic hydrocarbon of 1-20 $h^{-1}$, and a molar ratio of hydrogen to $C_9^+$ aromatic hydrocarbon of 0.5-20:1.

5. A method for producing light aromatic hydrocarbons comprising the steps of:
1) Contacting a feedstock comprising a $C_9^+$ paraffinic hydrocarbon with a dehydrogenation catalyst in the presence of hydrogen in a first reaction zone for a first reaction to dehydrocyclize at least a part of the $C_9^+$ paraffinic hydrocarbon to obtain a $C_9^+$ aromatic hydrocarbon to obtain a product stream comprising the $C_9^+$ aromatic hydrocarbon, wherein the dehydrogenation catalyst comprises alumina and a Group VIII metal, a Group IVA metal, a Group IA metal and a halogen supported thereon;
2) Contacting the product stream comprising the $C_9^+$ aromatic hydrocarbon obtained in step 1) with a dealkylation catalyst in the presence of hydrogen in a second reaction zone for a second reaction to dealkylate at least a part of the $C_9^+$ aromatic hydrocarbon to obtain a light aromatic hydrocarbon, wherein the dealkylation catalyst comprises a KL zeolite, platinum, and a modifying metal supported thereon, wherein the modifying metal is selected from the group consisting of Group IIA metals and rare earth metals.

6. The method according to claim 5, wherein the dealkylation catalyst of step 2) comprises the KL zeolite and 0.1-1.5% by mass of platinum and 0.02-4.0% by mass of the modifying metal, relative to the amount of the KL zeolite.

7. The method according to claim 5, wherein the dealkylation catalyst has one or more of the following characteristics:
the Group IIA metal is selected from the group consisting of barium and calcium;
the rare earth metal is selected from the group consisting of La, Ce, Gd, Y, Sm, and Yb; and/or
an average diameter of grains of the KL zeolite is 0.1-2 µm.

8. The method according to claim 5, wherein: in step 1),
in the dehydrogenation catalyst, the Group VIII metal is selected from the group consisting of platinum, palladium, and iridium, the Group IVA metal is selected from the group consisting of tin, germanium, and silicon, the Group IA metal is selected from the group consisting of potassium, sodium, rubidium, and cesium, and the halogen is selected from the group consisting of chlorine, fluorine, bromine, and iodine; and
the dehydrogenation catalyst comprises an alumina carrier and, relative to the amount of the alumina carrier, 0.1-2.0% by mass of a Group VIII metal, 0.1-2.0% by mass of a Group IVA metal, 0.01-0.2% by mass of a Group IA metal, and 0.3-5% by mass of a halogen.

9. The method according to claim 8, wherein the alumina carrier is γ-alumina carrier, and the dehydrogenation catalyst has a platinum content of 0.1-1.0% by mass, a tin content of 0.1-1.0% by mass, a potassium content of 0.02-0.1% by mass, and a chlorine content of 0.5-1.5% by mass, relative to the amount of the alumina carrier.

10. The method according to claim 5, wherein the first reaction is carried out at a reaction temperature of 400-500° C., a reaction pressure of 0.1-4.0 MPa, a mass space velocity of the feedstock comprising the $C_9^+$ paraffinic hydrocarbon of 1-50 $h^{-1}$, and a hydrogen-to-hydrocarbon molar ratio of 0.5-20:1.

11. The method according to claim 5, wherein the second reaction is carried out at a temperature of 350-490° C., a pressure of 0.1-4.0 MPa, a mass space velocity of the stream comprising the $C_9^+$ aromatic hydrocarbon of 1-20 $h^{-1}$, and a hydrogen-to-hydrocarbon molar ratio of 0.5-20:1.

12. The method according to claim 5, wherein the mass ratio of the dehydrogenation catalyst used in step 1) to the dealkylation catalyst used in step 2) is 1:(0.25-5).

13. The method according to claim 5, wherein the feedstock comprising the $C_9^+$ paraffinic hydrocarbon is naphtha selected from the group consisting straight run naphtha, hydrocracked heavy naphtha, hydrotreated coking gasoline, raffinate of ethylene pyrolysis gasoline, catalytic cracking gasoline, and mixtures thereof.

14. The method according to claim 13, further comprising, prior to step 1), subjecting the naphtha to a hydrofining treatment to remove arsenic, lead, copper, sulfur and nitrogen impurities contained therein.

15. The method according to claim 13, wherein the first reaction is controlled such that a conversion rate of naphthenic hydrocarbon in the naphtha is not less than 90% by mass and a conversion rate of $C_9^+$ paraffinic hydrocarbon is 70-95% by mass.

16. The method according to claim 13, wherein the first reaction is controlled such that a conversion rate of naphthenic hydrocarbon in the naphtha is not less than 90% by mass, wherein the conversion rates of both $C_7$ and $C_8$ naphthenic hydrocarbons in the naphtha are not less than 95% by mass, and the conversion rate of $C_6$ naphthenic hydrocarbon in the naphtha is not less than 70% by mass.

17. The method according to claim 13, wherein the first reaction is controlled such that a conversion rate of paraffinic hydrocarbon in the naphtha is not greater than 60% by mass, wherein a conversion rate of $C_6$ paraffinic hydrocarbon in the naphtha is not greater than 18% by mass, a conversion rate of $C_7$ paraffinic hydrocarbon in the naphtha is not greater than 30% by mass, a conversion rate of $C_8$ paraffinic hydrocarbon in the naphtha is not greater than 70% by mass, and a conversion rate of $C_9^+$ paraffinic hydrocarbon in the naphtha is 70-95% by mass.

18. The method according to claim 1, wherein the dealkylation catalyst comprises the KL zeolite and 0.3-1.2% by mass of platinum and 0.1-3.0% by mass of the modifying metal, relative to the amount of the KL zeolite.

19. The method according to claim 5, wherein the dealkylation catalyst comprises the KL zeolite, 0.3-1.2% by mass of platinum, and 0.1-3.0% by mass of the modifying metal, relative to the amount of the KL zeolite.

20. The method according to claim 8, wherein the dehydrogenation catalyst comprises an alumina carrier and, relative to the amount of the alumina carrier, 0.1-1.0% by mass of a Group VIII metal, 0.1-1.0% by mass of a Group IVA metal, 0.02-0.1% by mass of a Group IA metal, and 0.5-1.5% by mass of a halogen.

21. The method according to claim 5, wherein the first reaction is carried out at a reaction temperature of 450-480° C., a reaction pressure of 0.1-2.0 MPa, a mass space velocity of the feedstock comprising the $C_9^+$ paraffinic hydrocarbon of 1-10 $h^{-1}$, and a hydrogen-to-hydrocarbon molar ratio of 1-10:1.

22. The method according to claim 5, wherein the mass ratio of the dehydrogenation catalyst in the first reaction to the dealkylation catalyst in the second reaction is 1:(1.2-3).

23. The method according to claim 13, wherein the naphtha comprises naphthenic hydrocarbons having 6-12 carbon atoms, paraffinic hydrocarbons having 6-12 carbon atoms and aromatic hydrocarbons having 6-12 carbon atoms, and has an initial boiling point of 80-95° C. and a final boiling point of 135-180° C.

* * * * *